Oct. 24, 1939.                A. C. VAN HOOYDONK                2,177,555
                    DISCHARGE MEANS FOR MEAT CUTTING MACHINES
                        Filed April 25, 1938        2 Sheets-Sheet 1

Inventor,
Adrian C. Van Hooydonk,
by Walker P. Guyer
Attorney.

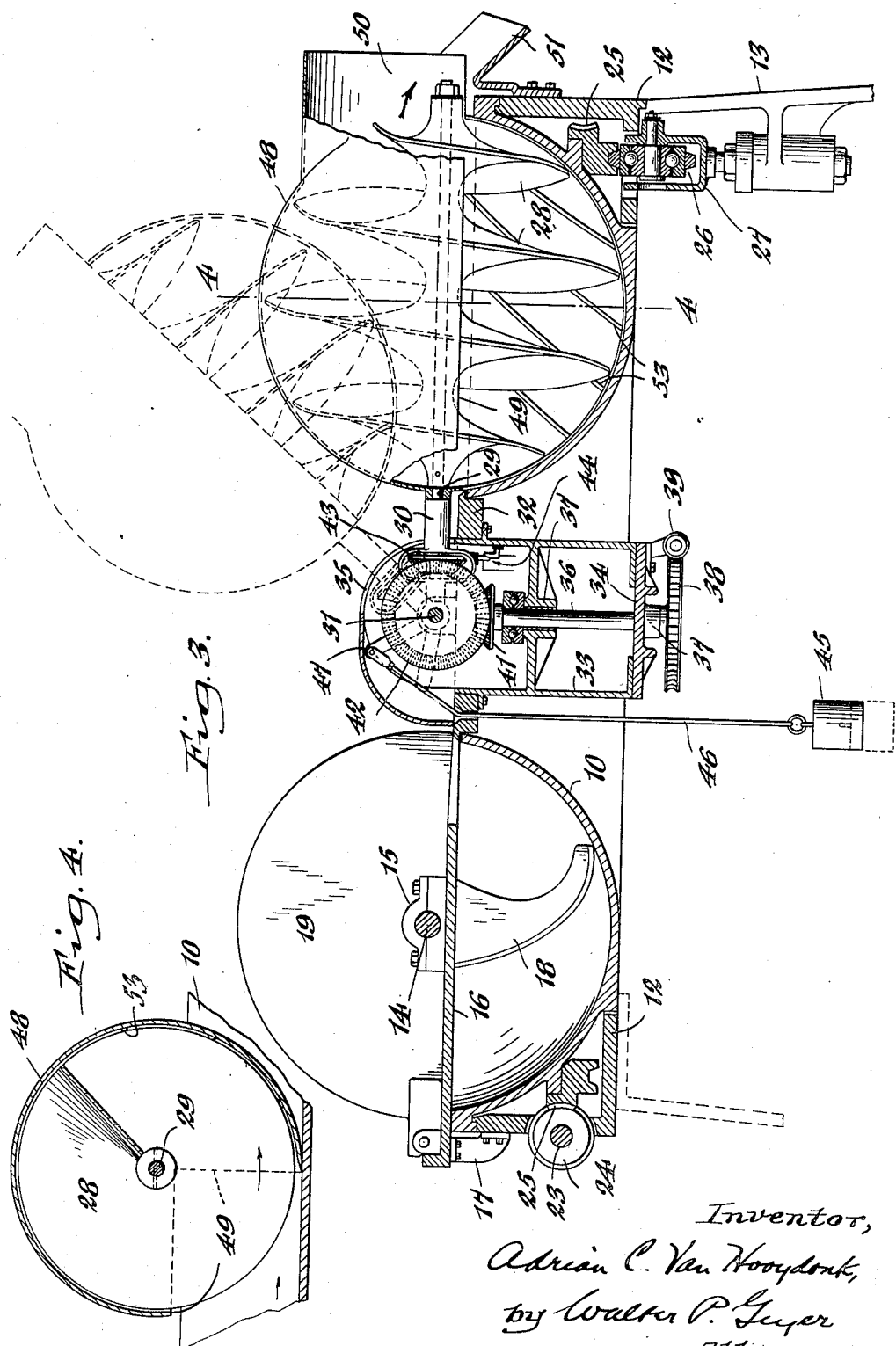

Patented Oct. 24, 1939

2,177,555

UNITED STATES PATENT OFFICE 2,177,555

DISCHARGE MEANS FOR MEAT CUTTING MACHINES

Adrian C. Van Hooydonk, Buffalo, N. Y., assignor to John E. Smith's Sons Company, Buffalo, N. Y., a corporation of New York Application April 25, 1938, Serial No. 204,114

11 Claims. (Cl. 146—67)

This invention relates generally to meat cutting machines but more particularly to a means for discharging the cut or chopped contents therefrom.

It has for one of its objects to provide a discharging means of this character which is simple in construction and efficient and sanitary in operation to effect a quick discharge of the cut contents from the machine.

Another object of the invention is the provision of a discharging device for meat cutting machines which is so designed as to be readily moved into and out of the revolving meat-bowl, and which includes a combined chambered member or scoop and conveyor structure for intercepting the meat as the bowl revolves and transferring it to a discharge point beyond the bowl.

Figure 1:
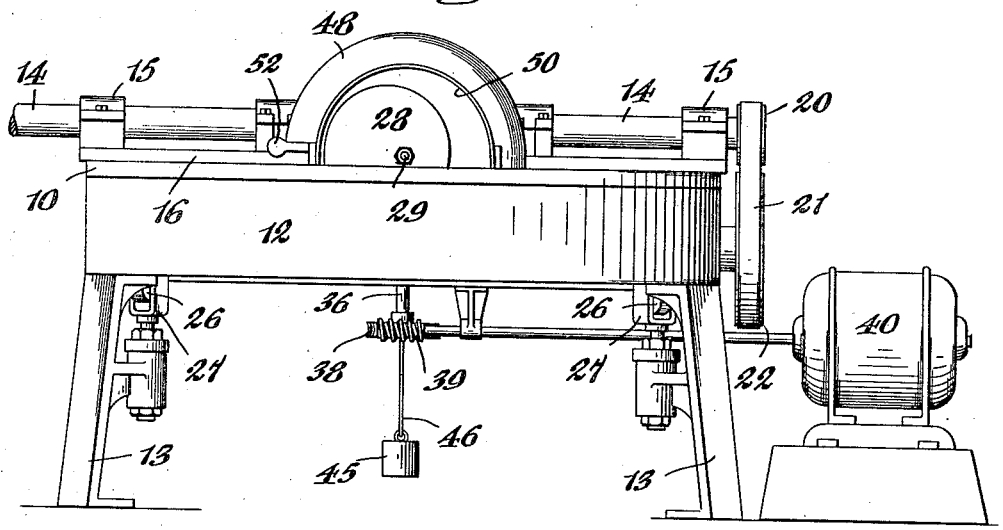
Figure 2:
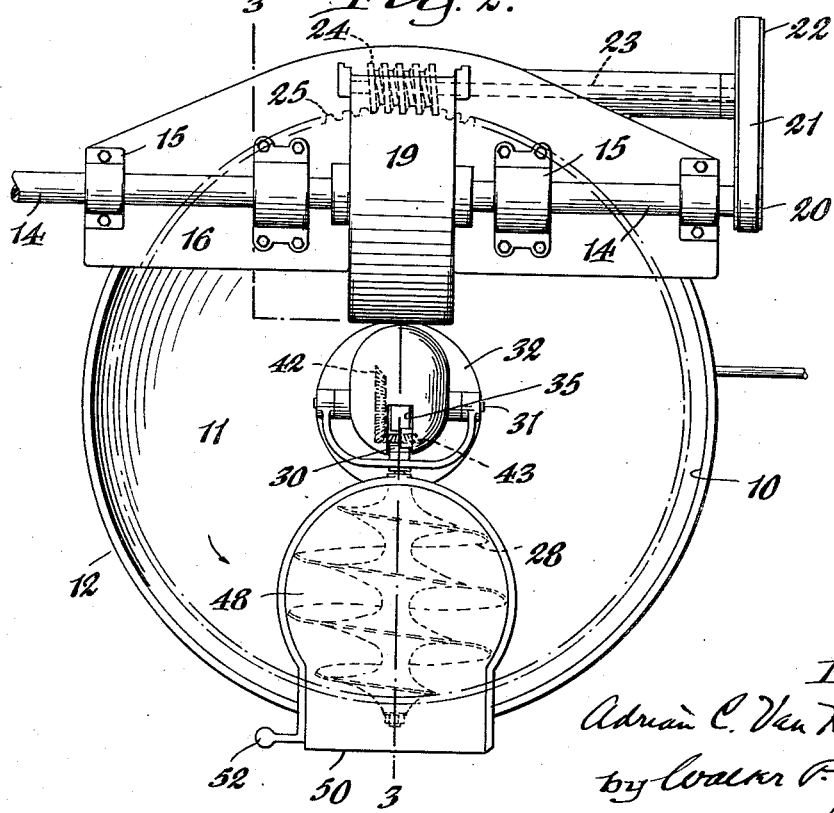

In the accompanying drawings:

Figure 1 is a side view of a meat cutting machine equipped with my discharge means. Figure 2 is a top plan view thereof. Figure 3 is an enlarged transverse section taken on line 3—3, Figure 2. Figure 4 is a cross section taken on line 4—4, Figure 3.

Similar characters of reference indicate corresponding parts throughout the several views.

My invention is shown, by way of example, in connection with a meat cutting machine of the rotary bowl type, 10 indicating the meat bowl having an annular meat-receiving trough 11 and supported at its periphery on a bed ring 12 which is in turn mounted on suitable supports 13. The numeral 14 indicates the drive shaft of the machine which is disposed transversely over the rear portion of the meat bowl at one side of its axis and journaled in suitable bearings 15 applied to a cover plate 16 arranged over the adjoining rear portion of the bowl and supported by brackets 17 to the bed ring 12. Mounted on this shaft and extending crosswise into the trough-shaped bowl are one or more knives or cutters 18 which are adapted to revolve in the bowl during its rotation for cutting the meat or other food. A suitable hood 19 rising from the cover encloses the cutters.

The shaft 14 also serves to rotate the bowl 10 and for this purpose the same is provided at one end with a pulley 20 connected by a belt 21 with a companion pulley 22 mounted on a parallel counter shaft 23 journaled in appropriate bearings applied to the bed ring 12 and having a worm 24 thereon engaging a worm wheel 25 secured to the lower portion of the meat bowl. Adjacent its lower end, the meat bowl is also supported on rollers 26 suitably supported in bearing brackets 27 borne by the supports 13.

The means for discharging the cut meat from the bowl is generally in the form of a conveyor screw and an associated enclosure or scoop-like member or chamber, such parts being mounted as a unit for movement into and out of operative engagement with the bowl and serving, during the rotation of the bowl, to intercept and effect a scooping of the meat from the bowl into the chamber and thence discharge the meat therefrom over the side of the bowl into a suitable receptacle provided for receiving it. In its preferred construction, this conveyor screw 28 is fixed on a driven shaft 29 disposed radially over the meat bowl 10 for vertically-swinging movement relative thereto, and in its operative discharging position the screw dips into and extends transversely of the bowl-trough, as seen in Figures 2 and 3, and for this purpose the peripheral contour of the screw is substantially spherical so that each thread of this screw is disposed generally tangentially to the trough-shaped contour of the bowl with the lower halves of the threads in intercepting relation to or in the path of travel of the meat as the bowl revolves relatively to the screw. The screw-shaft 29 is supported at its inner end on a vertically-swinging bearing member or bracket 30 which is pivotally mounted on a horizontal shaft 31 disposed at right angles to the said conveyor shaft, whereby the conveyor is free to swing into and out of a discharge position in the bowl. The shaft 31 is arranged over the central portion of the bowl with its axis intersecting the turning axis of the bowl and may be supported in suitable bearings rising from a central cover plate 32 which spans the space between the inner walls of the bowl, as shown in Figure 3, and extends over the top edges of the inner rim portions of the bowl to prevent the meat overflowing into such space. This plate is supported on a housing 33 which partially encloses the shaft 31 and which rises from a platform or frame-piece 34 extending transversely below the bed-ring 12 of the machine. At its front and adjoining top side the housing has an arcuate slot 35 therein through which the swinging bearing member 30 of the conveyor screw extends for permitting the movement of the latter into and out of its discharge position.

While any suitable means may be employed for driving the conveyor screw 28, that shown in the drawings, Figures 2 and 3, is preferable and consists of an upright shaft 36 journaled axially of the meat bowl in suitable bearings 37 formed in the housing 33 and frame-piece 34 and having a worm wheel 38 at its lower end meshing with a worm 39 driven from an electric motor 40 or like power-source. At its upper end, which is disposed within the housing 33, this shaft has a bevel gear 41 meshing with a ring gear 42 loosely mounted on the shaft 31 and also meshing with said ring gear is a second bevel gear 43 applied to the conveyor screw shaft 29. When the motor is turned on, motion is transmitted to the shaft 36 and through the bevel and ring gears to the conveyor screw. If desired, a switch 44 may be included in the motor circuit and positioned for automatic opening and closing in the path of the swinging bearing member 30, so that when the conveyor screw is lowered into the meat bowl the motor-circuit will be closed and when it is swung upwardly out of the bowl the motor circuit will be opened.

A counterweight 45 is connected by a flexible suspension element 46 to a radial arm 47 projecting from the rear side of the swinging bearing member 30 for movement in the rear portion of the housing 33 and which functions to maintain the conveyor screw in its elevated inoperative position shown by dotted lines in Figure 3.

Enclosing or enveloping the major portion of the conveyor screw 28, to cooperate therewith in intercepting and directing the meat laterally from the bowl 10, is a substantially globular casing or chambered scoop-like member 48 which is attached to the bearing member 30 to move in unison with the screw to and from its discharging position relative to the bowl. As shown in Figures 3 and 4, this casing encloses approximately three-fourths of the cross-sectional area of the conveyor screw, being open as indicated at 49, at that side and lower portion thereof facing circumferentially in the direction of rotation of the meat bowl to provide a meat inlet through which the meat is scooped or introduced into the casing and then propelled by the screw through a lateral discharge opening or passage 50 formed in the outer end of the casing from which the meat drops onto an inclined chute 51 into a receptacle provided for receiving it. The lower half portion of this casing seats within and is concentric with the meat-trough 11 and constitutes a scoop for intercepting the meat and, as the bowl revolves, the meat is guided into the upper portion of the casing 48 and discharged therefrom in continuous fashion by the conveyor screw. The casing may be provided with a convenient hand-grip 52 for facilitating its raising and lowering movement. Also, the inner wall of the casing may have curved ribs 53 thereon, which, in conjunction with the feed screw, force the meat through the casing toward its discharge opening.

When operating, the casing may be first brought down in surface contact with the meat and then gradually dipped further and further into the bowl until its contents is emptied.

I claim as my invention:

1. A meat cutting machine, comprising a rotary, substantially trough-shaped bowl, chambered means movable into and out of a stationary position intercepting relation with the meat in the bowl to receive the meat therein during the rotation of the bowl, and means operatively arranged within said chambered intercepting means for rotation about an axis substantially radially of the bowl for conveying the meat received therein to a point exterior of the bowl.

2. A meat cutting machine, comprising a rotary, substantially trough-shaped bowl, a meat-receiving chamber movable into and out of engagement with the bowl and shaped at its lower side in substantial conformity to the trough-shape of said bowl, said chamber having an opening therein below the top plane of the bowl for receiving the meat during the rotation of the bowl and a discharge opening above such plane and a rotary conveyor arranged in said chamber for discharging the meat therefrom through said discharge opening to a point exterior of the bowl.

3. A meat cutting machine, comprising a rotary, trough-shaped meat bowl, a scoop-like member mounted for movement into and out of nesting-like engagement with said bowl crosswise thereof to intercept and receive the meat therefrom during the rotation of the bowl and having an outlet for the meat substantially radially thereof, a screw conveyor applied to said member substantially radially of said bowl for discharging the intercepted meat through said outlet, and means for actuating said conveyor.

4. A meat cutting machine, comprising a rotary, trough-shaped meat bowl, a hollow substantially spherical-shaped meat-receiving chamber mounted for movement into and out of the bowl in crosswise relation thereto with its lower portion arranged to seat within the bowl and having an inlet opening therein in the circumferential path of travel of the meat in the bowl and a discharge opening disposed in the upper portion of said chamber radially of the bowl, and means arranged in said chamber and rotatable about an axis substantially radially of the bowl for conveying the meat received therein toward said discharge opening.

5. A meat cutting machine, comprising a rotary, substantially trough-shaped bowl, a chambered member movable into and out of a meat-receiving position in the bowl, the lower portion of said member being shaped to conform with the trough-shape of said bowl and being open at one side to scoop the meat into the same during relative rotation of the bowl, the upper portion of said member having an opening for the discharge of the meat, a conveyor screw housed within said chamber and having the peripheral contour of its threads shaped to conform generally to the trough-shaped section of the bowl and chamber, and means for actuating said screw to convey the meat from said chamber through its discharge opening.

6. A meat cutting machine, comprising a rotary trough-shaped meat bowl, a conveyor screw of substantially spherical shape disposed with its axis generally radially of the bowl and mounted for movement into and out of operative relation therewith, the lower portion of said screw extending into the bowl-trough in its operative position, and a substantially spherical chamber enclosing said screw for movement therewith into and out of the bowl and having an opening therein in the plane of movement of the bowl-trough for the introduction of the meat into the same during the rotation of the bowl and a second opening in said chamber above the plane of movement of the bowl and in endwise relation to the conveyor screw for the discharge of the conveyed meat.

7. A meat cutting machine, comprising a rotary, substantially trough-shaped bowl, a vertically-swinging bracket disposed radially over the bowl and pivoted in intersecting relation to the bowl axis, a screw conveyor journaled on said bracket and shaped to conform with the bowl-trough to engage the same in one position thereof, and a meat-receiving chamber applied to said bracket and enclosing said screw and having an opening in its lower portion for the introduction of the meat into the same during the rotation of the bowl and an opening in its upper portion in endwise relation to the conveyor screw for the discharge of the conveyed meat.

8. A meat cutting machine, comprising a rotary, substantially trough-shaped bowl, a vertically-swinging bracket disposed radially over the bowl and pivoted in intersecting relation to the bowl axis, a screw conveyor journaled on said bracket and shaped to conform with the bowl-trough to engage the same in one position thereof, a meat-receiving chamber applied to said bracket and enclosing said screw and having an opening in its lower portion for the introduction of the meat into the same during the rotation of the bowl and an opening in its upper portion in endwise relation to the conveyor screw for the discharge of the conveyed meat, a drive shaft disposed axially of the bowl, and gearing interposed between said drive shaft and said conveyor screw for actuating the latter.

9. A meat cutting machine, comprising a rotary, substantially trough-shaped bowl, a vertically-swinging bracket disposed radially over the bowl and pivoted in intersecting relation to the bowl axis, a screw conveyor journaled on said bracket and shaped to conform with the bowl-trough to engage the same in one position thereof, a meat-receiving chamber applied to said bracket and enclosing said screw and having an opening in its lower portion for the introduction of the meat into the same during the rotation of the bowl and an opening in its upper portion in endwise relation to the conveyor screw for the discharge of the conveyed meat, a drive shaft disposed axially of the bowl and having a pinion at its upper end, a ring gear loosely mounted on the bracket-pivot and meshing with said shaft-pinion, and a pinion applied to the conveyor screw and meshing with said ring gear.

10. A meat cutting machine, comprising a rotary, substantially trough-shaped bowl, a vertically-swinging bracket disposed radially over the bowl and pivoted in intersecting relation to the bowl axis, a screw conveyor journaled on said bracket and shaped to conform with the bowl-trough to engage the same in one position thereof, a meat-receiving chamber applied to said bracket and enclosing said screw and having an opening in its lower portion for the introduction of the meat into the same during the rotation of the bowl and an opening in its upper portion in endwise relation to the conveyor screw for the discharge of the conveyed meat, and counter-weighted means connected to said bracket for retaining the screw and its enclosing chamber in an elevated position above the bowl.

11. A meat cutting machine, comprising a rotary, substantially trough-shaped meat bowl, a stationary cover-plate disposed axially of the bowl in adjoining relation to its inner peripheral wall, a vertically-swinging bracket pivoted on said cover-plate with its axis intersecting the bowl-axis, and a combined scoop-like member and conveyor screw applied to said bracket substantially radially of the bowl for movement into and out of engagement with the bowl-trough to intercept and discharge the meat to a point exterior of the bowl, the scoop-like member having a meat-inlet in the plane of movement of the bowl and a meat-discharge radially of the bowl and above the axis of said conveyor screw.

ADRIAN C. VAN HOOYDONK.